FOOT COVER AND METHOD OF MANUFACTURING THE SAME

Original Filed Nov. 12, 1959 2 Sheets-Sheet 1

FOOT COVER AND METHOD OF MANUFACTURING THE SAME

Original Filed Nov. 12, 1959 2 Sheets-Sheet 2

United States Patent Office

Re. 26,667
Reissued Sept. 23, 1969

26,667

FOOT COVER AND METHOD OF MANUFACTURING THE SAME

Edgar Gary Sarbo, Vienna, Austria, assignor, by mesne assignments, to Wayne-Gossard Corporation, a corporation of Indiana Original No. 3,059,458, dated Oct. 23, 1962, Ser. No. 852,442, Nov. 12, 1959. Application for reissue Nov. 12, 1968, Ser. No. 796,625

Int. Cl. D04b *9/46*

U.S. Cl. 66—171 4 Claims

Matter enclosed in heavy brackets [ ] appears in the original patent but forms no part of this reissue specification; matter printed in italics indicates the additions made by reissue.

*ABSTRACT OF THE DISCLOSURE*

*A symmetrical pouch-like seamless stretchable foot cover provided with a rim including rubber at the top and a seam across the bottom. The foot cover is adapted to fit in stretched condition around the lower part of the foot completely concealed from view when worn within low cut shoes.*

This invention relates to undersocks or foot covers and to methods of manufacturing the same.

Undersocks or foot covers are conventionally made from woven fabric blanks and sometimes from knitted semi-finished products of composite constructions which have a number of seams whereby, for example, the front top part of the foot cover is connected to the base thereof and the latter is joined at its rear edge. Known methods of manufacture thus involve certain surplus steps and costs particularly for sewing, and the finished article generally has pronounced seams and requires sewn-in rubber elements in the form of a tape.

It is an object of the invention to provide an improved method of manufacturing undersocks or foot covers. In one respect, methods of the invention are characterized in that a seamless tube is formed which consists of a continuous sequence of tubular elements each of which corresponds to an undersock or foot cover and each of which consists essentially of a rim having an integrated rubber thread and a body. Surplus courses followed by separating courses are interposed between the individual tube elements so that the individual tube elements can be separated, the courses being contatenated and then closed off or hemmed so that each foot cover is finished at its lower end by a seam of relatively high stretchability.

Such undersocks or foot covers may be manufactured most advantageously by the use of mass production techniques at relatively low cost. They have no seam other than the highly stretchable almost imperceptible seam indicated above. The upper rim of the product is very flat and has an excellent elasticity.

Illustrative embodiments of undersocks or foot covers made according to the invention will next be described and are diagrammatically illustrated in the accompanying drawing in which.

Figure 3:
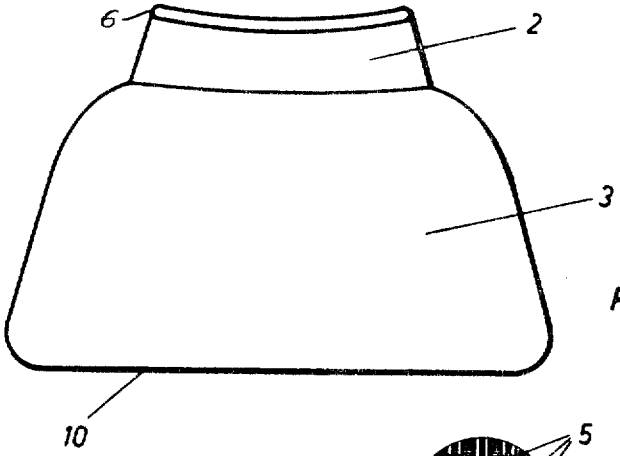
Figure 4A:
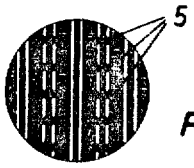
Figure 4:
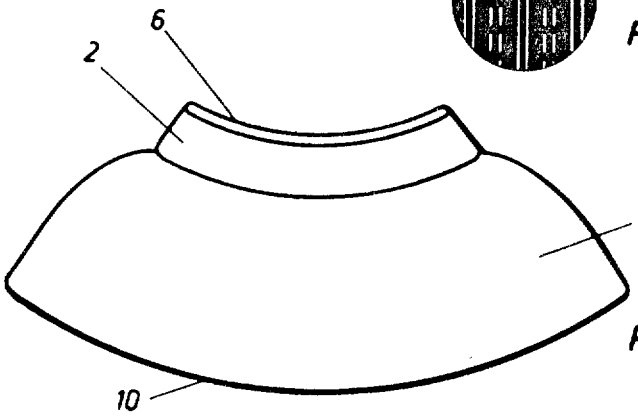

FIGS. 3 and 4 each show a finished foot cover;

FIG. 4a illustrates a detail in enlarged scale; and

Figure 5:
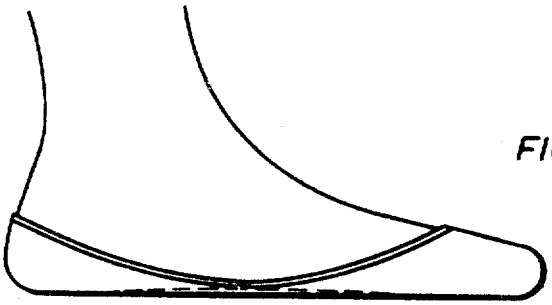

FIG. 5 shows a foot cover forming an end product of the method of the invention.

Figure 1:
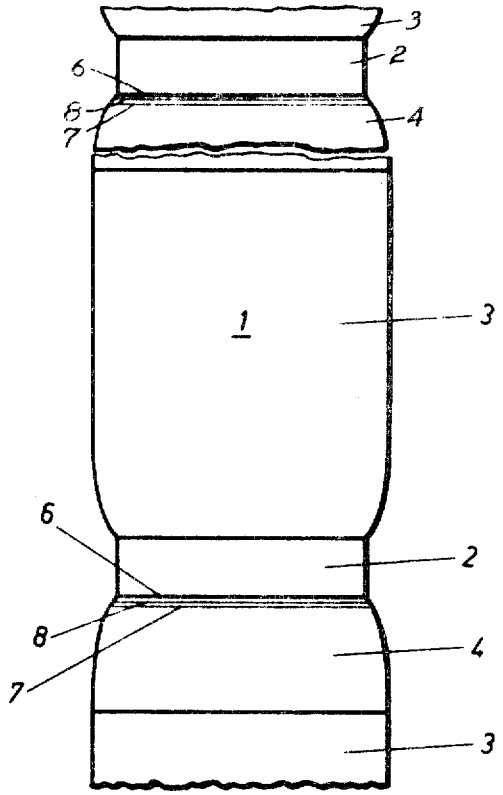
FIG. 1 shows a portion of a continuous seamless hose including elements of an article of manufacture provided in accordance with the invention.
Figure 2:
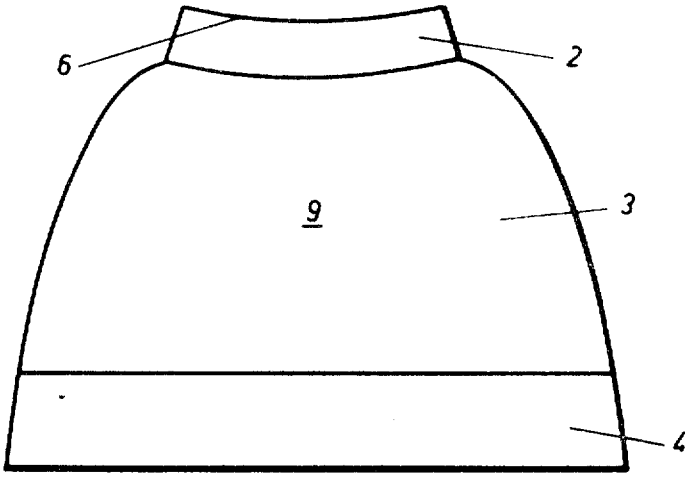
FIG. 2 illustrates a semi-finished foot cover.

In the drawing, seamless tube 1 consists of periodically recurring hose elements each of which corresponds to one foot cover. Each hose element consists essentially of three sections, namely a rim 2, a body 3 and a surplus course 4. The seamless tube 1 may be made on a conventional machine and suitable for this purpose would be, for example, a [single-roller, double-roller or] *single cylinder or double cylinder* circular knitting machine the operation of which requires only a special setting of a conventional control drum or the like. During the knitting of the rim 2, a rubber thread 5 is incorporated or inserted in the yarn by means of a conventional rubber feeding device as is known for hosiery machines. This rubber thread is inserted (*e.g. laid-in*) in the manner of a woven fabric (FIG. 4a) such that the rubber thread lies substantially along the periphery of the rim and transversely of the knitting direction. The rubber thread can be wound with the same tension as the other threads, so that when the tube is withdrawn from the machine, the resilience of the rubber thread causes reduction in the diameter of the rim portion 2 as seen in FIG. 2. Rim 2 in the illustrated embodiment has a length of about 1 cm. At the transition from the rim 2 to the body 3, the rubber thread is omitted and knitting of the hose is continued. The length of this body depends on the material used and may be, for example, about 4–6 cms. After the body 3 has been formed in the desired length, the knitting yarn for the foot cover is suitably replaced by a cheaper yarn with which the knitting is continued, for example, for about 2 centimeters to form surplus courses 4. These surplus courses 4 are followed by separating courses 7 (and, if desired, break threads 8) to define the limit of an individual hose element which will be subsequently used to make a foot cover. This is followed by the starting edge for a new element.

The seamless tube 1, which is collected, for example, in a container, may comprise any desired number of hose elements and is removed from the machine after a predetermined number of hose elements such as, perhaps, one hundred, have been completed. Then the hose elements can be manually separated from the seamless tube to obtain the semi-finished foot covers 9, one of which is shown in FIG. 2. The separation is effected by cutting the hose at the separating courses and pulling out the separating thread. The top part of the foot cover terminated with the starting rim 6 is now finished. Next the semi-finished foot cover 9 must be closed at its lower end spaced from the rim 2. For this reason it is cast onto needles at the surplus courses 4 on a circular or flat linking machine of known type. This machine suitably cuts off the surplus courses 4, brushes off the cut surface and closes off the course applied to said needles. By this seam 10 (closing seam, machine seam or the like), the foot cover is finished at its lower end and assumes a form which is pocket or bag-like.

The material for the parts 2 and 3 of the hose elements may consist of stretch yarn, crimped yarn, or cotton or wool yarn and the like. FIG. 3 shows the shape of a foot cover made from cotton whereas FIG. 4 shows a foot cover made from crimped yarn. Mixed crimped and ply yarns or any other known combination of yarns may be used. The use of crimped yarn has the advantage that the foot cover can be manufactured in uniform size for all foot sizes. Since the surplus courses 4 are cut off, they are preferably made from cheap material such as cotton.

The seamless hose is conventionally knitted so as to be extremely elastic and extensible because the diameter of the tube 1 is preferably matched to that of the lower calf of the leg whereas the end product, which is the finished foot cover, must accommodate the size of the foot. The desired result thus can be achieved only with a very high stretchability and elasticity which insures at the same time a good hugging of the foot by the foot cover.

FIG. 5 shows a foot cover in use. The rubber threads 5 incorporated in the rim 2 avoids local constriction as would result from the use of a rubber tape. This is favored by the fact that the rim of the foot cover according to the invention is relatively wide without being thick. The single seam 10 integrates with the knit courses and does not protrude when the foot cover is worn. It is also highly stretchable as is particularly important in the use of the cover and the stretchability of the foot cover is not adversely affected by this seam.

Compared to the foot covers made according to known processes, the foot covers made by the method of the invention can be manufactured efficiently and at low cost. Further, they insure a good fit with a soft, resilient pressure. Owing to the method of manufacture from a seamless hose, as has been described hereinbefore, they completely avoid irritating the foot.

What is claimed is:

1. A method of manufacturing a plurality of foot covers consisting of a continuous sequence of tubular hose elements, comprising the steps of knitting continuously a seamless tubular hose, forming alternately during said knitting step three distinct symmetrical portions, first, a rim including rubber threads, second, a body and third, surplus courses between the end of said body and the start of the next rim, each of said three distinct portions, respectively, being of the same knitting structure throughout its entire length and throughout its entire periphery, cutting off said surplus courses, and forming a stretchable seam at the end of said body opposite said rim entirely across said tubular hose.

2. A knitted tubular hose for the manufacture of a plurality of foot covers, including a seamless tube comprised alternately of a rim and of a body of greater axial length than said rim, said rim including at least some rubber threads, said rim and said body, each, respectively, consisting of the same knitting structure throughout its axial length and throughout its entire periphery, and a surplus course disposed between said rim and the body adjacent thereto, a transverse seam formed at the end of said body opposite said rim and a break thread disposed between said rim and the surplus course adjacent thereto.

[3. A knitted foot cover comprising a seamless tubular rim including at least some rubber threads, said rim being adapted to form an opening for a foot entry, a seamless tubular body having an axial length greater than that of said rim and connected with said rim, said rim and said body, each, respectively, consisting of the same knitting structure throughout its entire axial length and throughout its entire periphery, and a seam formed at the end of said body opposite said rim, to form a symmetrical pouch-like body, and said body being adapted to function as tip, sole and heel portions of said foot cover.]

*4. A knitted foot cover characterized by being extremely elastic and extensible for being fitted in a highly stretched condition upon the asymmetrical configuration of the lower part of the foot of a wearer with the foot cover being of such height as to be positioned below the ankle in foot hugging, stretched condition, completely concealed from view when worn within low cut shoes, said foot cover comprising*

*a seamless stretchable tubular rim including at least some rubber threads,*

*said rim being adapted to form an opening for a foot entry,*

*a seamless stretchable tubular body having an axial length greater than that of said rim and connected with said rim,*

*said rim and said body, each, respectively, consisting of the same knitting structure throughout its axial length and throughout its entire periphery, and*

*a seam formed at the end of said body opposite said rim to form a symmetrical pouch-like body, and*

*said body being adapted to function as tip, sole and heel portions of said foot cover,*

*whereby upon placing the foot cover on the lower part of a foot, the attendant stretching of the foot cover reduces the combined axial length of said rim and said body and the foot cover fits over and hugs only the lower portion of the foot with said rim positioned on the asymmetrical portion of the foot below the ankle.*

*5. A knitted foot cover characterized by being extremely elastic and extensible for being fitted in a highly stretched condition upon the asymmetrical configuration of the lower part of the foot of a wearer with the foot cover being of such height as to be positioned below the ankle in foot hugging, stretched condition, completely concealed from view when worn within low cut shoes, said foot cover comprising*

*a seamless stretchable tubular rim including at least some rubber threads,*

*said rim being adapted to form an opening for a foot entry,*

*a seamless stretchable tubular body having an axial length greater than that of said rim and connected with said rim,*

*said rim and said body, each, respectively, consisting of the same knitting structure throughout its axial length and throughout its entire periphery, and the combined axial length of said rim and said body being about 5 to 7 centimeters,*

*a seam formed at the end of said body opposite said rim to form a symmetrical pouch-like body, and*

*said body being adapted to function as tip, sole and heel portions of said foot cover,*

*whereby upon placing the foot cover on the lower part of a foot, the attendant stretching of the foot cover reduces the combined axial length of said rim and said body and the foot cover fits over and hugs only the lower portion of the foot with said rim positioned on the asymmetrical portion of the foot below the ankle.*

References Cited

The following references, cited by the Examiner, are of record in the patented file of this patent or the original patent.

UNITED STATES PATENTS

| | | | |
|---|---|---|---|
| D. 86,152 | 2/1932 | Bellak. | |
| 1,544,934 | 7/1925 | Prankard. | |
| 1,724,784 | 8/1929 | Teichmann | 2—239 |
| 1,830,471 | 11/1931 | LeDorf | 36—10 |
| 1,841,518 | 1/1932 | Bellak | 66—182 XR |
| 1,936,064 | 11/1933 | Mills | 2—239 |
| 1,991,624 | 2/1935 | Paul | 36—10 |

(Other references on following page)

UNITED STATES PATENTS

| | | | |
|---|---|---|---|
| 2,001,293 | 5/1935 | Wilson | 66—171 |
| 2,038,844 | 4/1936 | LeDorf | 36—10 |
| 2,246,079 | 6/1941 | St. Pierre | 66—172 |
| 2,333,373 | 11/1943 | Grey | 66—171 |
| 2,344,773 | 3/1944 | Herbert | 36—10 |
| 2,391,165 | 12/1945 | Kasket | 36—10 |
| 2,400,692 | 5/1946 | Herbert | 36—10 |
| 2,623,374 | 12/1952 | Hinchman | 66—182 |
| 2,649,588 | 8/1953 | Kantor | 2—61 |
| 2,699,056 | 1/1955 | Margulies | 66—182 |
| 2,739,467 | 3/1956 | Stern | 66—185 |
| 2,771,691 | 11/1956 | Luchs | 36—10 |
| 2,825,215 | 5/1958 | Buckrevs | 66—185 |

| | | | |
|---|---|---|---|
| 2,881,603 | 4/1959 | Vendetti | 66—172 XR |
| 2,896,339 | 7/1959 | Rabinowitz | 36—10 |

FOREIGN PATENTS

| | | |
|---|---|---|
| 554,888 | 3/1923 | France. |
| 362,040 | 10/1922 | Germany. |
| 841,131 | 11/1952 | Germany. |
| 184.470 | 3/1923 | Great Britain. |
| 102,524 | 12/1923 | Switzerland. |

WM. CARTER REYNOLDS, Primary Examiner

U.S. Cl. X.R.

66—172